United States Patent
Leis (10) Patent No.: US 11,540,347 B2
(45) Date of Patent: Dec. 27, 2022

(54) INTERWORKING BETWEEN MOBILE RAILWAY NETWORKS AND GSM NETWORKS

(71) Applicant: NOKIA TECHNOLOGIES OY, Espoo (FI)

(72) Inventor: Peter Leis, Penzberg (DE)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 17/297,758

(22) PCT Filed: Dec. 3, 2018

(86) PCT No.: PCT/EP2018/083250
§ 371 (c)(1),
(2) Date: May 27, 2021

(87) PCT Pub. No.: WO2020/114568
PCT Pub. Date: Jun. 11, 2020

(65) Prior Publication Data
US 2022/0039199 A1    Feb. 3, 2022

(51) Int. Cl.
*H04W 76/45* (2018.01)
*H04W 4/10* (2009.01)
*H04W 8/26* (2009.01)
*H04W 92/02* (2009.01)

(52) U.S. Cl.
CPC ............ *H04W 76/45* (2018.02); *H04W 4/10* (2013.01); *H04W 8/26* (2013.01); *H04W 92/02* (2013.01)

(58) Field of Classification Search
CPC ......... H04W 76/45; H04W 4/10; H04W 8/26; H04W 92/02
See application file for complete search history.

(56) References Cited

U.S. PATENT DOCUMENTS

2016/0227588 A1* 8/2016 Patel .................... H04W 76/45

FOREIGN PATENT DOCUMENTS

CN          109218996 A   *   1/2019
WO     WO 2008/021513 A2       2/2008

OTHER PUBLICATIONS

International Search Report & Written Opinion dated Jul. 31, 2019 corresponding to International Patent Application No. PCT/EP2018/083250.

(Continued)

*Primary Examiner* — Hai V Nguyen
(74) *Attorney, Agent, or Firm* — Squire Patton Boggs (US) LLP (57) ABSTRACT

A server receives a call request for a mission critical, push to talk (MCPTT) call. In response to receiving the call request, the server accesses a mapping of an MCPTT identifier of a user equipment with an interworking identifier that is formed according to an address format implemented in Global System for Mobile communications (GSM) for Railways (GSM-R). The server then forwards the call request from the server based on the mapping. In some cases, the MCPTT identifier is a uniform resource identifier (URI) and the interworking identifier is represented in an e164 format.

20 Claims, 6 Drawing Sheets

(56) References Cited

OTHER PUBLICATIONS

3GPP TR 23.796 V0.5.0 (Oct. 2018), Technical Report, 3rd Generation Partnership Project; Technical Specification Group Services and System Aspects; Study on application architecture for the Future Railway Mobile Communication System (FRMCS) Phase 2; Stage 2 (Release 16), Oct. 26, 2018, XP051500704.
3GPP TS 23.283 V16.0.0 (Sep. 2018), Technical Specification, 3rd Generation Partnership Project; Technical Specification Group Services and Systems Aspects; Mission Critical Communication Interworking with Land Mobile Radio Systems; Stage 2 (Release 16), Oct. 8, 2018, XP051545274.
Communication pursuant to Article 94(3) EPC dated Apr. 14, 2022 corresponding to European Application No. 18833170.6.

\* cited by examiner

| MCPTT SERVER ID 305 | MCPTT UE ID 310 | INTERWORKING ID 315 |
|---|---|---|
| 00001 | john.doe@example.com | +49 (089) 1234-5678 |
| 00001 | jane.doe@example.com | +49 (089) 5678-1234 |
| ... | | |

INTERWORKING BETWEEN MOBILE RAILWAY NETWORKS AND GSM NETWORKS

BACKGROUND

Mission critical, push to talk (MCPTT) refers to a PTT product functionality that meets the requirements of Public Safety mission-critical voice communication, which include high availability/reliability, low latency, support for group calls and 1:1 calls, talker identification, device-to device (D2D) direct communication, emergency calling, clear audio quality, and the like. In conjunction with other organizations, the Third Generation Partnership Project (3GPP) is developing standards for implementing MCPTT over networks that operate according to the Long Term Evolution (LTE) standards and Fifth Generation (5G) defined by the 3GPP. The MCPTT standards for LTE/5G operation address call types, floor control, priority, preemption, performance, group management, off-network use, security, interworking with non-LTE PTT systems, and the like. Communication within railway systems is an important application and 3GPP is currently developing a mobile communication system for railways that is based on MCPTT. A user equipment in a railway mobile communication system establishes a session using an application implemented on the user equipment, which communicates with an MCPTT server that connects to an LTE core network. The MCPTT system is required to interconnect and interoperate with other networks, e.g., to support communication in numerous regions traversed by a railway system. Implementing MCPTT without interoperability would severely impact voice communications where coverage is poor or in regions that choose other vendors that implement different networks. Thus, limited interoperability would reduce the value of the MCPTT system to railway organizations.

SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an apparatus is provided that includes a transceiver configured to receive a call request for a mission critical, push to talk (MCPTT) call and a processor configured to access, in response to receiving the call request, a mapping of an MCPTT identifier of a user equipment with an interworking identifier that is formed according to an address format implemented in Global System for Mobile communications (GSM) for Railways (GSM-R). The transceiver forwards the call request based on the mapping.

In some embodiments, the MCPTT identifier is a uniform resource identifier (URI) and the interworking identifier is represented in an e164 format.

In some embodiments, the mapping is stored in a user profile that includes a binding between the MCPTT identifier, the interworking identifier, and an identifier of the apparatus.

Some embodiments of the apparatus include a memory configured to store the user profile in a routing table, wherein the processor is configured to access the mapping from the memory.

Some embodiments of the processor are configured to access the mapping from a database that is implemented external to the apparatus.

Some embodiments of the transceiver are configured to receive the call request including the MCPTT identifier in response to the user equipment initiating the MCPTT call. Some embodiments of the processor are configured to add the interworking identifier to the call request prior to forwarding the call request to an interworking function associated with a GSM-R system.

In some embodiments, the interworking identifier is displayed to a GSM-R client or used to initiate another call to the user equipment by the GSM-R client.

Some embodiments of the transceiver are configured to receive the call request including an identifier in the address format implemented in GSM-R in response to a GSM-R client initiating a call.

Some embodiments of the processor are configured to resolve the identifier into the MCPTT identifier of the user equipment, and wherein the transceiver is configured to forward the call request to the user equipment based on the MCPTT identifier.

In some embodiments, a method is provided that includes receiving, at a server, a call request for a mission critical, push to talk (MCPT) call and accessing, from the server and in response to receiving the call request, a mapping of an MCPTT identifier of a user equipment with an interworking identifier that is formed according to an address format implemented in Global System for Mobile communications (GSM) for Railways (GSM-R). The method also includes forwarding the call request from the server based on the mapping.

In some embodiments of the method, the MCPTT identifier is a uniform resource identifier (URI) and the interworking identifier is represented in an e164 format.

Some embodiments of the method include storing the mapping in a user profile that includes a binding between the MCPTT identifier, the interworking identifier, and an identifier of the server.

In some embodiments of the method, storing the mapping in the user profile includes storing the user profile in a routing table implemented in the server and accessing the mapping includes accessing the mapping from the user profile.

In some embodiments of the method, accessing the mapping includes accessing the mapping from a database that is implemented external to the server.

Some embodiments of the method include receiving, at the server, the call request including the MCPTT identifier in response to the user equipment initiating the MCPTT call, adding, at the server, the interworking identifier to the call request, and forwarding, from the server, the call request to an interworking function associated with a GSM-R system.

Some embodiments of the method include displaying the interworking identifier to a GSM-R client.

Some embodiments of the method include receiving, at the server, an other call request from a GSM-R client to initiate another call to the user equipment, wherein the other call request includes the interworking identifier.

Some embodiments of the method include receiving, at the server, the call request including an identifier in the address format implemented in GSM-R in response to a GSM-R client initiating a call.

Some embodiments of the method include resolving, at the server, the identifier into the MCPTT identifier of the user equipment and forwarding, from the server, the call request to the user equipment based on the MCPTT identifier.

In some embodiments, an apparatus is provided that includes means for receiving, at a server, a call request for a mission critical, push to talk (MCPTT) call and means for accessing, from the server and in response to receiving the call request, a mapping of an MCPTT identifier of a user equipment with an interworking identifier that is formed according to an address format implemented in Global System for Mobile communications (GSM) for Railways (GSM-R). The apparatus also includes means for forwarding the call request from the server based on the mapping.

In some embodiments of the apparatus, the MCPTT identifier is a uniform resource identifier (URI) and the interworking identifier is represented in an e164 format.

Some embodiments of the apparatus include means for storing the mapping in a user profile that includes a binding between the MCPTT identifier, the interworking identifier, and an identifier of the server.

Some embodiments of the apparatus include means for storing the user profile in a routing table implemented in the server and accessing the mapping includes accessing the mapping from the user profile.

Some embodiments of the apparatus include means for accessing the mapping from a database that is implemented external to the server.

Some embodiments of the apparatus include means for receiving the call request including the MCPTT identifier in response to the user equipment initiating the MCPTT call, means for adding the interworking identifier to the call request, and means for forwarding the call request to an interworking function associated with a GSM-R system.

Some embodiments of the apparatus include means for displaying the interworking identifier to a GSM-R client.

Some embodiments of the apparatus include means for receiving, at the server, an other call request from a GSM-R client to initiate another call to the user equipment. The other call request includes the interworking identifier.

Some embodiments of the apparatus include means for receiving, at the server, the call request including an identifier in the address format implemented in GSM-R in response to a GSM-R client initiating a call.

Some embodiments of the apparatus include means for resolving, at the server, the identifier into the MCPTT identifier of the user equipment and forwarding, from the server, the call request to the user equipment based on the MCPTT identifier.

In some embodiments, an apparatus is provided that includes at least one processor and at least one memory including computer program code. The at least one memory and the computer program code are configured to, with the at least one processor, cause the apparatus at least to perform receiving a call request for a mission critical, push to talk (MCPTT) call. The at least one memory and the computer program code are also configured to, with the at least one processor, cause the apparatus at least to perform accessing, in response to receiving the call request, a mapping of an MCPTT identifier of a user equipment with an interworking identifier that is formed according to an address format implemented in Global System for Mobile communications (GSM) for Railways (GSM-R) and forwarding the call request based on the mapping.

In some embodiments of the apparatus, the MCPTT identifier is a uniform resource identifier (URI) and the interworking identifier is represented in an e164 format.

Some embodiments of the apparatus include means for storing the mapping in a user profile that includes a binding between the MCPTT identifier, the interworking identifier, and an identifier of the server.

In some embodiments, the at least one memory and the computer program code are configured to, with the at least one processor, cause the apparatus at least to perform storing the user profile in a routing table implemented in the server and accessing the mapping includes accessing the mapping from the user profile.

In some embodiments, the at least one memory and the computer program code are configured to, with the at least one processor, cause the apparatus at least to perform accessing the mapping from a database that is implemented external to the server.

In some embodiments, the at least one memory and the computer program code are configured to, with the at least one processor, cause the apparatus at least to perform receiving the call request including the MCPTT identifier in response to the user equipment initiating the MCPTT call, adding the interworking identifier to the call request, and forwarding the call request to an interworking function associated with a GSM-R system.

In some embodiments, the at least one memory and the computer program code are configured to, with the at least one processor, cause the apparatus at least to perform displaying the interworking identifier to a GSM-R client.

In some embodiments, the at least one memory and the computer program code are configured to, with the at least one processor, cause the apparatus at least to perform receiving, at the server, an other call request from a GSM-R client to initiate another call to the user equipment. The other call request includes the interworking identifier.

In some embodiments, the at least one memory and the computer program code are configured to, with the at least one processor, cause the apparatus at least to perform receiving, at the server, the call request including an identifier in the address format implemented in GSM-R in response to a GSM-R client initiating a call.

In some embodiments, the at least one memory and the computer program code are configured to, with the at least one processor, cause the apparatus at least to perform resolving, at the server, the identifier into the MCPTT identifier of the user equipment and forwarding, from the server, the call request to the user equipment based on the MCPTT identifier.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

An important example of an outside network for a railway mobile communication system is a Global System for Mobile communications (GSM) network that provides services to railways (GSM-R). The GSM-R standards define a secure platform for voice and data communication between railway operational staff including drivers, dispatchers, shunting team members, train engineers, station controllers, and the like. GSM-R implements features including group calls, voice broadcast, location-based connections, and call preemption in case of an emergency. However, interoperability between GSM-R and MCPTT systems is limited or prevented because GSM-R and MCPTT systems use different addressing schemes to identify user equipment in the corresponding systems. The GSM-R system identifies user equipment and users with numbers that are defined according to the e164 format, e.g., a maximum of fifteen digits including up to three digits for a country code and twelve digits for a subscriber number. The MCPTT system implements a scheme based on uniform resource identifiers (URI) that identify user equipment and users using a set of letters or numbers to identify a scheme (e.g., sip, http, https, ldap, mailto, and the like), a path, a query, or a fragment of a page. For example, a user "John Doe" can be identified by the URI: john.doe@example.com.

FIGS. 1-6 disclose techniques to support interoperability between an MCPTT based railway mobile communication system and a GSM-R system by storing information associating an MCPTT identifier of a user equipment or a user with an interworking identifier that is formed according to the address format implemented in GSM-R. The MCPTT identifier is a uniform resource identifier (URI) and the interworking identifier is represented in the e164 format. A user profile for the user equipment includes a binding between the MCPTT identifier, the interworking identifier, and an MCPTT server. In some embodiments, the user profile is configured as part of a registration procedure performed by the user equipment and the MCPTT server. The user profile is stored in a routing table in the MCPTT server or an external database that is queried based on an identifier of the MCPTT server.

In response to the user equipment initiating a call, the call request is forwarded to the MCPTT server, which adds the interworking identifier to the call request. For example, the interworking identifier can be encoded into the body of the request. The call request including the interworking identifier is then forwarded to an interworking function, which forwards the call request to a GSM-R client. Some embodiments of the GSM-R client display the interworking identifier to the user to allow the user to identify the calling party. In some cases, the GSM-R client initiates a return call to the user equipment in the MCPTT based railway mobile communication system using the interworking identifier. In response to the GSM-R client initiating a call, a call request including an identifier of the user equipment in the e164 format is forwarded to an interworking function that identifies a corresponding MCPTT server. The call request is then forwarded from the interworking function to the MCPTT server. The identifier in the call request corresponds to an interworking identifier of the user equipment. The MCPTT server resolves the e164 address into the MCPTT identifier of the user equipment. The call request is then forwarded to the user equipment based on the MCPTT identifier.

Figure 1:
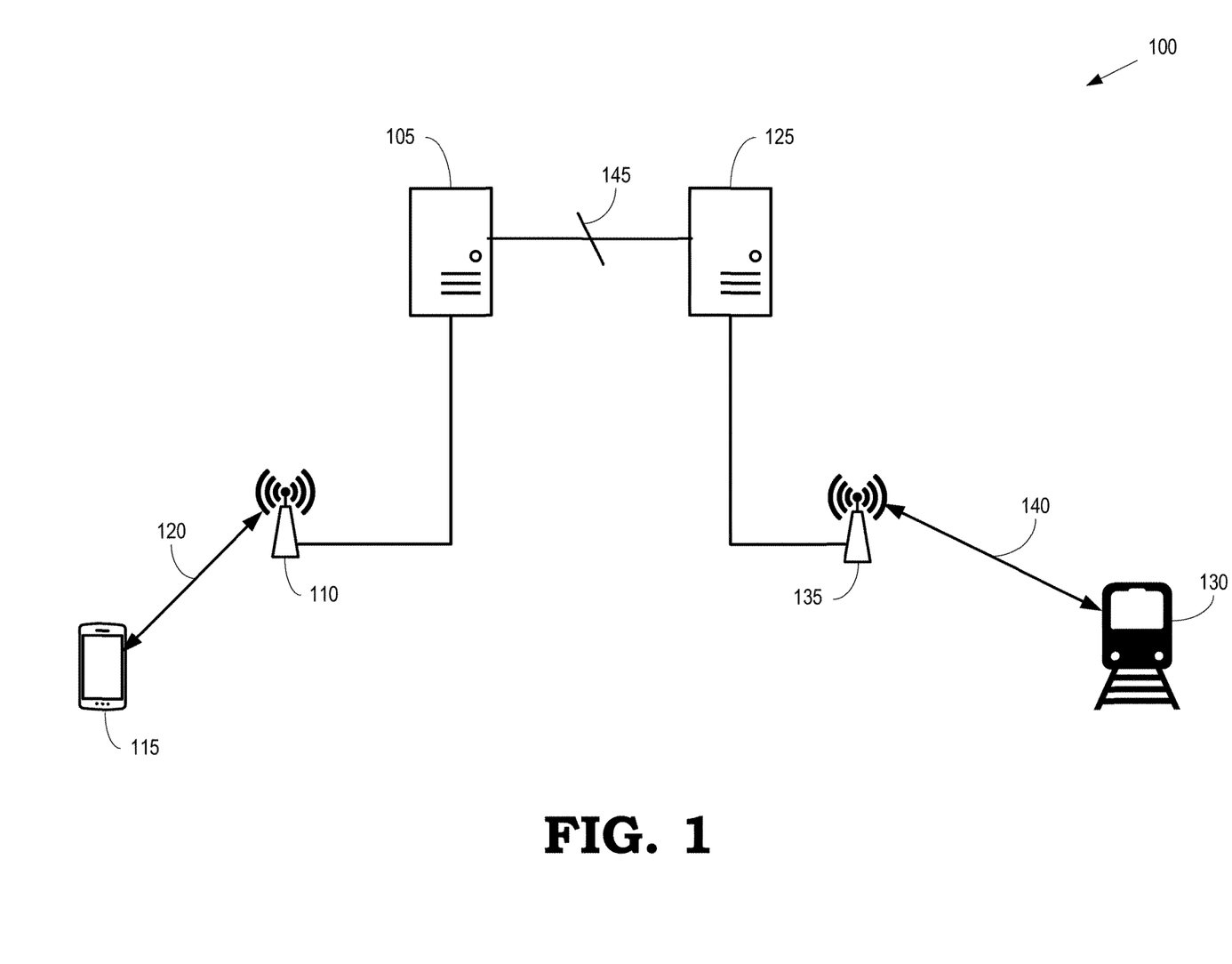
FIG. 1 is a block diagram of a communication system according to some embodiments.

FIG. 1 is a block diagram of a communication system 100 according to some embodiments. The communication system 100 includes a server 105 that supports mission critical, push to talk (MCPTT) applications. As used herein, the term MCPTT refers to a PTT product functionality that meets the requirements of Public Safety mission-critical voice communication, which include high availability/reliability, low latency, support for group calls and 1:1 calls, talker identification, device-to device (D2D) direct communication, emergency calling, clear audio quality, and the like. Some embodiments of the MCPTT server 105 implement MCPTT according to the Long Term Evolution (LTE) standards and Fifth Generation (5G) defined by the Third Generation Partnership Project (3GPP) in conjunction with other organizations. The MCPTT standards for LTE/5G operation address call types, floor control, priority, preemption, performance, group management, off-network use, security, interworking with non-LTE PIT systems, and the like.

The MCPTT server 105 provides the MCPTT service via one or more base stations 110 that establish wireless connections with one or more user equipment 115 over an air interface 120. The user equipment 115 (or corresponding users) are identified by an MCPTT identifier. In some embodiments, the MCPTT identifier is a URI that identifies the user equipment 115 (or the corresponding user) using a set of letters or numbers to identify a scheme, a path, a query, or a fragment of a page. For example, the user equipment 115 can be identified by the URI: johnsUE@example.com. For another example, a user "John Doe" can be identified by the URI: john.doe@example.com. Call requests transmitted by the user equipment 115 to the MCPTT server 105 include the MCPTT identifier and the MCPTT server 105 uses the MCPTT identifier to route call requests to the user equipment 115.

The communication system 100 also includes a server 125 that is implemented as a part of a railway mobile communication system that provides communication to users or user equipment in a railway system, e.g., users or user equipment on one or more trains 130. Some embodiments of the GSM-R server 125 operate according to the GSM-R standards. The GSM-R server 125 establishes wireless connections with users or user equipment on the train 130 via a base station 135 over an air interface 140. In some embodiments, the wireless connection between the users or user equipment on the train 130 and the base station 135 is established in a predetermined standard GSM-R band in the range 876-880 MHz for uplink data transmission and 921-925 MHz for downlink data transmission, although other frequency bands are used for GSM-R in other regions. The user equipment (or users) on the train 130 identified by a GSM identifier or MSISDN that is defined according to the e164 format, e.g., a maximum of fifteen digits including up to three digits for a country code and twelve digits for a subscriber number. For example, user equipment (or corresponding user) on the train 130 can be identified by a phone number such as +49 (089) 1234-5678.

The MCPTT server 105 and the GSM-R server 125 communicate over an interface 145. Some embodiments of the interface 145 are implemented using an interworking function, as discussed below. However, call requests for MCPTT services cannot be directly exchanged between the user equipment 115 and user equipment (or users) on the train 130 because the user equipment 115 in the MCPTT system and the user equipment (or users) in the GSM-R system do not use the same format for their identifiers. An interworking identifier having the same format as the GSM identifiers used in the GSM-R system (e.g., the e164 format) is therefore assigned to the user equipment 115 to facilitate communication with other user equipment (or users) in the GSM-R system. The MCPTT server 105 receives call requests for MCPTT calls from either the user equipment 115 or the user equipment (or users) in the GSM-R system. In response to receiving the call request, the MCPTT server 105 accesses a mapping that associates the MCPTT identifier within interworking identifier. The call request is then forwarded based on the interworking identifier. Some embodiments of the MCPTT server 105 incorporate the interworking identifier into call requests received from the user equipment 115 on the uplink. Some embodiments of the MCPTT server 105 use the interworking identifier to route call requests to the user equipment 115 on the downlink.

Figure 2:
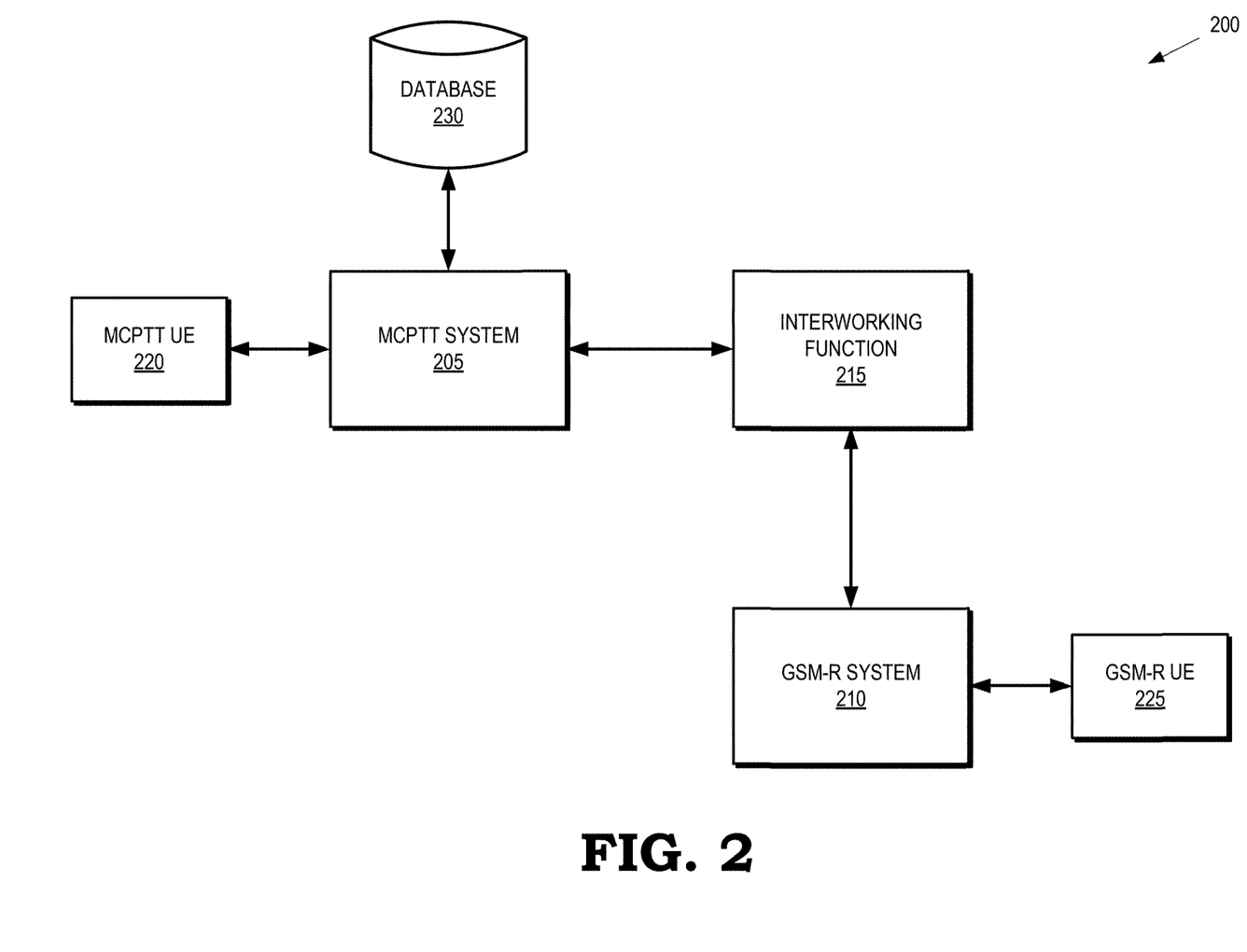
FIG. 2 is a block diagram of a communication system that supports interworking between an MCPTT system and a GSM-R system according to some embodiments.

FIG. 2 is a block diagram of a communication system 200 that supports interworking between an MCPTT system 205 and a GSM-R system 210 according to some embodiments. The MCPTT system 205 includes some embodiments of the MCPTT server 105 shown in FIG. 1. The GSM-R system 210 includes some embodiments of the GSM-R server 125 shown in FIG. 1. Interworking between the MCPTT system 205 and the GSM-R system 210 is performed, at least in part, according to the 3GPP Technical Report 23.796. In the illustrated embodiment, the communication system 200 includes an interworking function 215 to support interworking between the MCPTT system 205 and the GSM-our system 210.

The MCPTT system 205 and the GSM-R system 210 use different addressing schemes. The MCPTT system 205 provides wireless connectivity to an MCPTT user equipment 220 that is identified by an MCPTT identifier in the URI format. The GSM-R system 210 provides wireless connectivity to a GSM-R user equipment 225 that is identified by a GSM identifier or MSISDN in the e164 format. An interworking identifier is therefore assigned to the MCPTT user equipment 220 to make the MCPTT user equipment 220 reachable from within the GSM-R system 210. The interworking identifier complies with the requirements for numbering and routing in the GSM-R system 210 and is therefore based on MSISDN, i.e., the interworking identifier is defined in the e164 format. The interworking identifier allows the MCPTT user equipment 220 to be reached within the MCPTT system 205. The interworking identifier is also used by the GSM-R system 210 to set up communication towards the MCPTT system 205.

The interworking identifier for the MCPTT user equipment 220 is administered as a part of configuration of a user profile for a user associated with the MCPTT user equipment 220. In some embodiments, user profile configuration is performed according to mechanisms defined in the 3GPP Technical Specification 24.484. Proprietary configuration techniques can also be used to configure the user profile. Configuration of the MCPTT user equipment 220 includes generating a binding between the interworking identifier, the MCPTT identifier of the user equipment 220, and an address of the MCPTT server 205. Some embodiments of the MCPTT server 205 store the binding in an internal database.

The binding can also be stored in an external database 230 that is accessible by the MCPTT server 205.

Once configured, the MCPTT user equipment 220 includes the interworking identifier in call control signaling towards the GSM-R user equipment 225. The included interworking identifier is used to identify the MCPTT user equipment 220. The GSM-R user equipment 225 uses the interworking identifier to identify its communication partner. The identity of the communication partner can then be displayed to a user of the GSM-R user equipment 225, e.g., using a caller identification application. Some embodiments of the GSM-R user equipment 225 generate responses such as callback requests to the MCPTT user equipment 220 based on the interworking identifier received from the MCPTT user equipment 220. The interworking identifier is also used in call control signaling to address information for communication from the GSM-R system 210 towards the MCPTT system 205.

The interworking identifier therefore supports reachability of the MCPTT user equipment 220 from the GSM-R system 210. The interworking identifier is also available for display on the GSM-R user equipment 225 to identify the calling party. The MCPTT server 205 manages the interworking identifier, which reduces the possibility of fraud and does not require that the MCPTT user equipment 220 become responsible for including or managing the interworking identifier.

Figure 3:
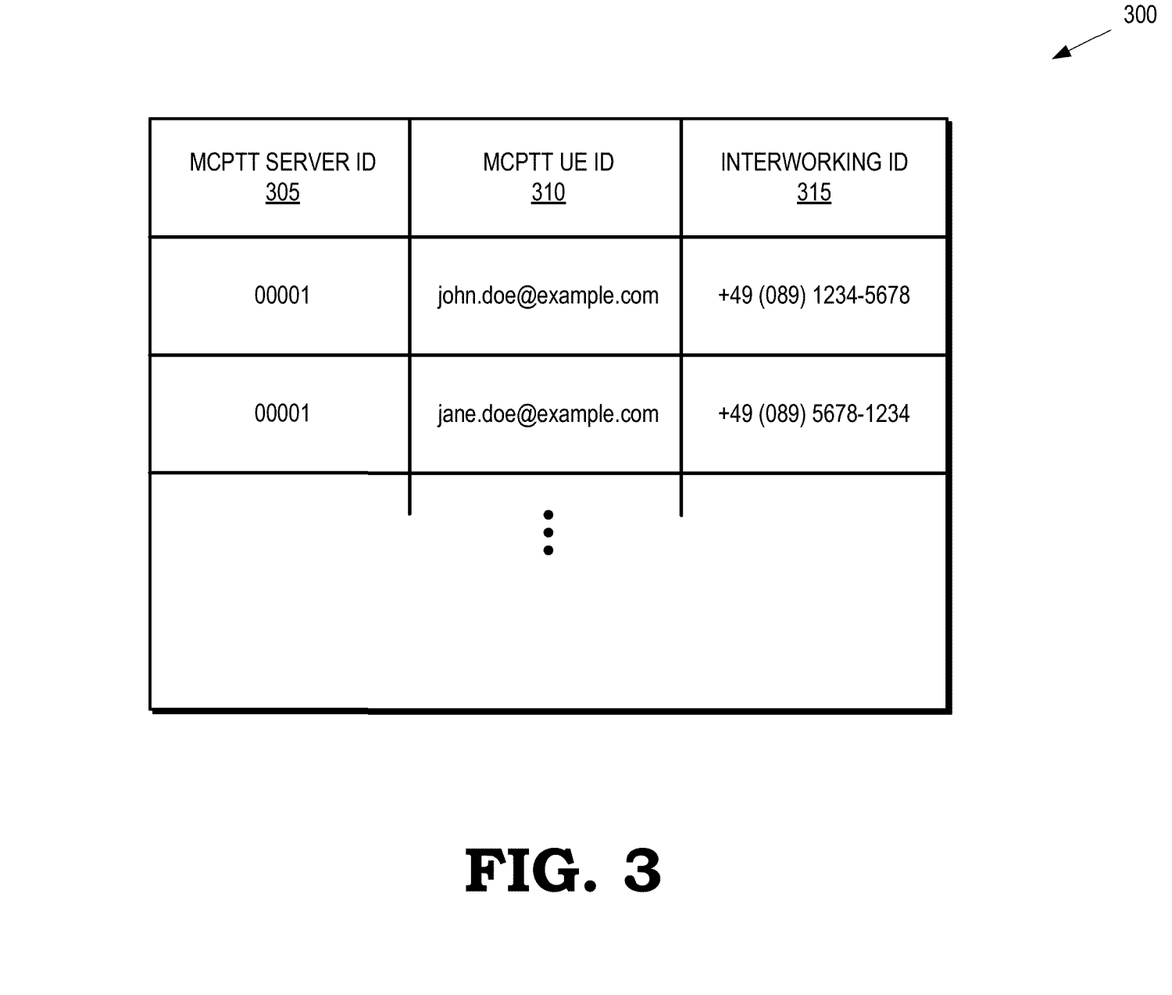
FIG. 3 is a block diagram of a database that maps identifiers of an MCPTT server and MCPTT user equipment to an interworking identifier according to some embodiments.

FIG. 3 is a block diagram of a database 300 that maps identifiers of an MCPTT server and MCPTT user equipment to an interworking identifier according to some embodiments. The database 300 is stored in some embodiments of the MCPTT server 105 shown in FIG. 1, the MCPTT system 205 shown in FIG. 2, and the external database 230 shown in FIG. 2. The rows in the database 300 represent the entries in the database 300 and the columns indicate the different identifiers. The MCPTT server identifier for each entry is stored in the column 305, the MCPTT user equipment identifier is stored in the column 310, and the interworking identifier that is assigned to the MCPTT user equipment is stored in the column 315. The entries represent a mapping or a binding between the identifiers associated with different user equipment. For example, the entry for a first user equipment indicates that it is served by the MCPTT server 00001 and the entry identifies the first user equipment using the MCPTT identifier john.doe@example.com. The MCPTT server identifier and the MCPTT identifier are mapped to an interworking identifier in the e164 format: +49 (089) 1234-5678. For another example, the entry for a second user equipment indicates that it is served by the MCPTT server 00001 and the entry identifies the second user equipment using the MCPTT identifier jane.doe@example.com. The MCPTT server identifier and the MCPTT identifier for the second user equipment are mapped to an interworking identifier in the e164 format: +49 (089) 5678-1234.

Figure 4:
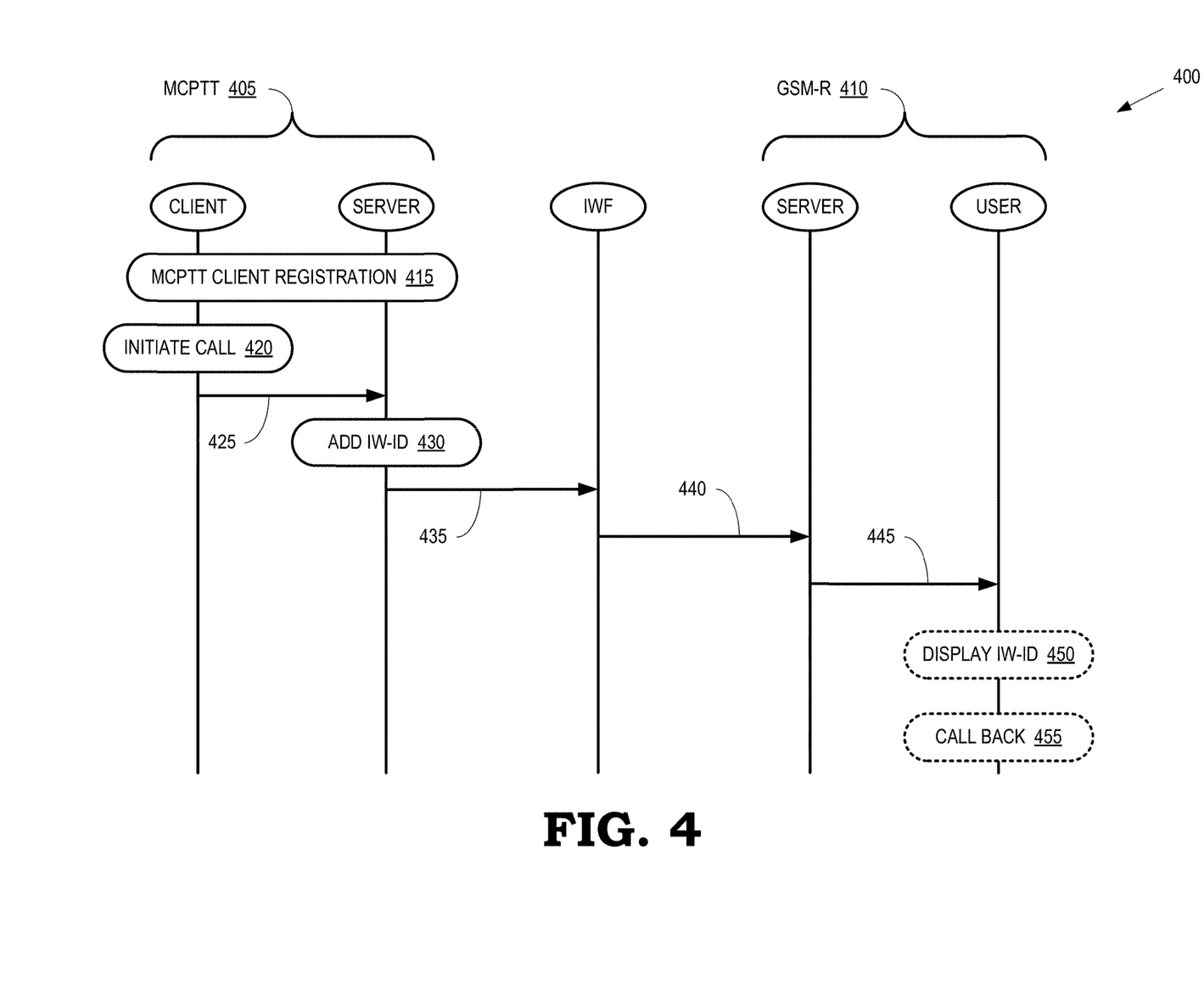
FIG. 4 is a message flow used to convey call requests over an uplink from an MCPTT system to a GSM-R system according to some embodiments.

FIG. 4 is a message flow 400 used to convey call requests over an uplink from an MCPTT system 405 to a GSM-R system 410 according to some embodiments. The MCPTT system 405 represents some embodiments of the MCPTT system 205 shown in FIG. 2. The MCPTT system 405 includes a client and a server such as the user equipment 115 and the server 105, respectively, shown in FIG. 1. The GSM-R system 210 includes a server and a user such as the GSM-R system 210 and the GSM-R user equipment 225, respectively, shown in FIG. 2.

At block 415, the MCPTT client registers with the MCPTT server. During the registration process, the MCPTT server attempts to locate a user profile for the MCPTT client. If the MCPTT server is unable to locate a previously created user profile, the MCPTT server creates a new user profile and associates the user profile with the MCPTT client. An interworking identifier is assigned to the MCPTT client (either previously or during the registration process at block 415). The interworking identifier is an MSISDN in e164 format. The MCPTT server creates a binding between an MCPTT identifier of the MCPTT client, the interworking identifier, and the identifier of the MCPTT server. The binding, which represents a mapping between the MCPTT identifier, the interworking identifier, and the identifier of the MCPTT server, is stored internally by the MCPTT server or an external database.

The MCPTT client initiates a call at block 420. The call is towards the GSM-R client in the GSM-R system 410. The MCPTT client therefore transmits a call request 425 that includes the MCPTT identifier of the MCPTT client and an identifier of the GSM-R client, such as an MSISDN in e164 format. The message 425 is received at the MCPTT server.

At block 430, the MCPTT server accesses a user profile for the MCPTT client based on the MCPTT identifier included in the call request 425. The user profile includes (at block 430) the interworking identifier that is assigned to the MCPTT client. The MCPTT server adds the interworking identifier into an outgoing call request 435. In some embodiments, the MCPTT server incorporates the interworking identifier into the body of the call request 435, e.g., as part of an application/vnd3gpp.mcptt-info+xml MIME body or any other suitable information element. The MCPTT server transmits the call request 435 including the interworking identifier to an interworking function (IWF), which forwards the call request 440 to the server in the GSM-R system 410. The server then forwards the call request 445 including the interworking identifier to the user in the GSM-R system 410.

The user in the GSM-R system 410 uses the interworking identifier as an indicator of the identity of the calling party, which in this case is the client in the MCPTT system 405. Some embodiments of the user display the interworking identifier at block 450, although this step is not necessarily performed as indicated by the dashed outline. Some embodiments of the user initiate a call back (at block 455) based on the interworking identifier. For example, the user can initiate a private call to the client in the MCPTT system 405 using the interworking identifier associated with the client and received in the call request 445.

Figure 5:
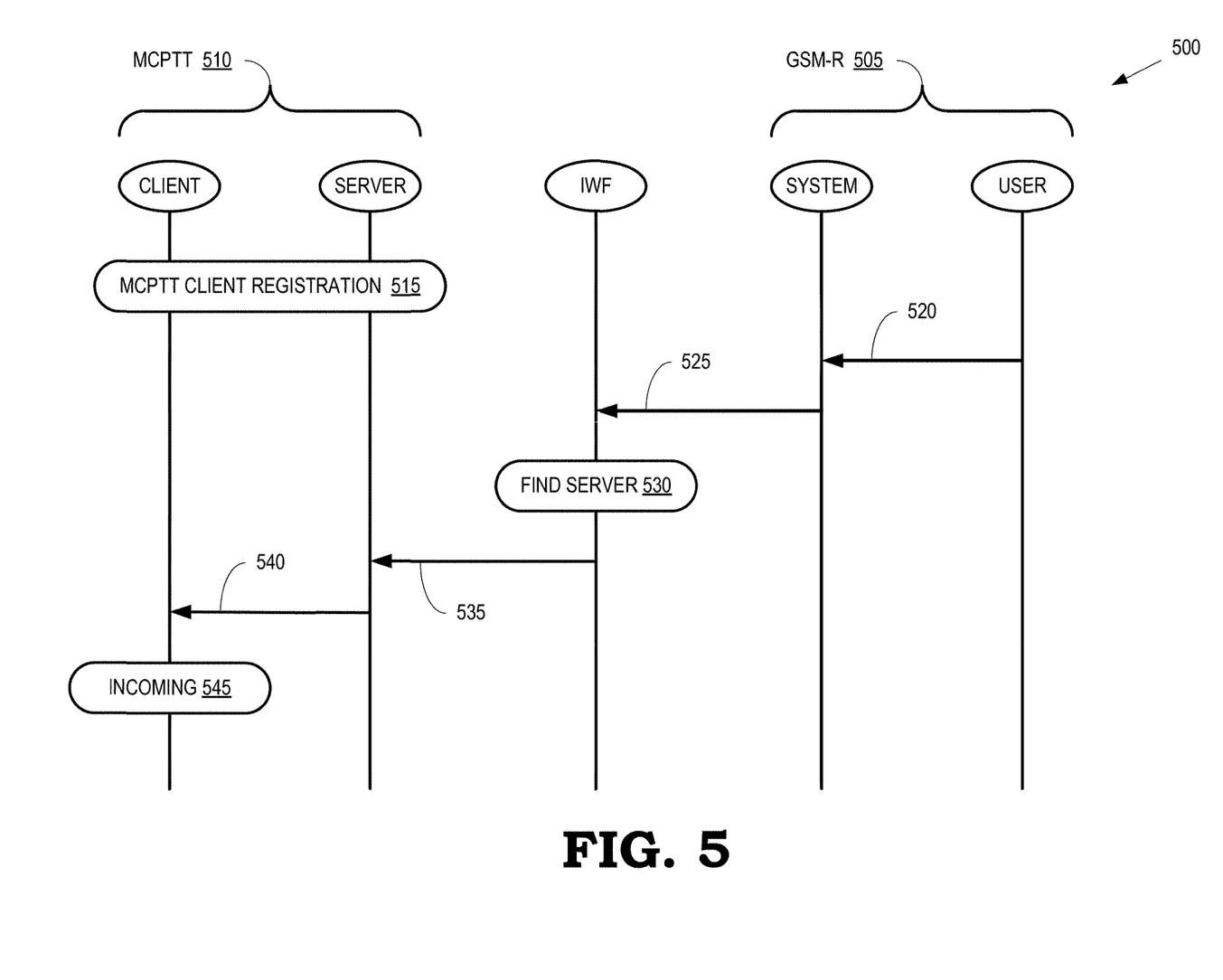
FIG. 5 is a message flow used to convey call requests over a downlink from a GSM-R system to an MCPTT system according to some embodiments.

FIG. 5 is a message flow 500 used to convey call requests over a downlink from a GSM-R system 505 to an MCPTT system 510 according to some embodiments. The MCPTT system 510 represents some embodiments of the MCPTT system 205 shown in FIG. 2. The MCPTT system 510 includes a client and a server such as the user equipment 115 and the server 105, respectively, shown in FIG. 1. The GSM-R system 505 includes a server and a user such as the GSM-R system 210 and the GSM-R user equipment 225, respectively, shown in FIG. 2.

At block 515, the MCPTT client registers with the MCPTT server. As discussed above, during the registration process, the MCPTT server accesses or creates a user profile that includes an interworking identifier that is assigned to the MCPTT client. The interworking identifier is an MSISDN in e164 format. The MCPTT server creates a binding between an MCPTT identifier of the MCPTT client, the interworking identifier, and the identifier of the MCPTT server, which is stored internally by the MCPTT server or in an external database.

The GSM-R client transmits a call request 520 that is addressed to the MCPTT client using the interworking identifier. For example, the GSM-R client can use an MSISDN in e164 format (e.g., the interworking identifier) as a destination address for the MCPTT client during the call set up procedure. The call request 520 is transmitted to the GSM-R server, which forwards the call request 525 to an interworking function (IWF).

The interworking function analyzes (at block 530) addressing information in the call request 525 received from the GSM-R server to identify the MCPTT server that serves the called party. Some embodiments of the interworking function identify the MCPTT server using an entry in a routing table that maps the called party information included in the call request 525 to the MCPTT server. Some embodiments of the interworking function identify the serving MCPTT server using an external database. In that case, the interworking function queries the external database to determine the address of the MCPTT server that serves the MCPTT user equipment. Entries in the external database include a binding MCPTT identifier, the interworking identifier, and the identifier of the MCPTT server. The interworking function then forwards the call request 535 to the MCPTT server based on the identifier.

In response to receiving the call request 535, the MCPTT server resolves the interworking identifier included in the call request 535 into the MCPTT identifier of the MCPTT user. As discussed herein, the MCPTT server resolves the interworking identifier using a mapping stored in an internal database or an external database. The MCPTT server then forwards a call request 540 to the MCPTT client using the MCPTT identifier. The MCPTT client provides an indication of the incoming call (at block 545) in response to receiving the call request 540.

Figure 6:
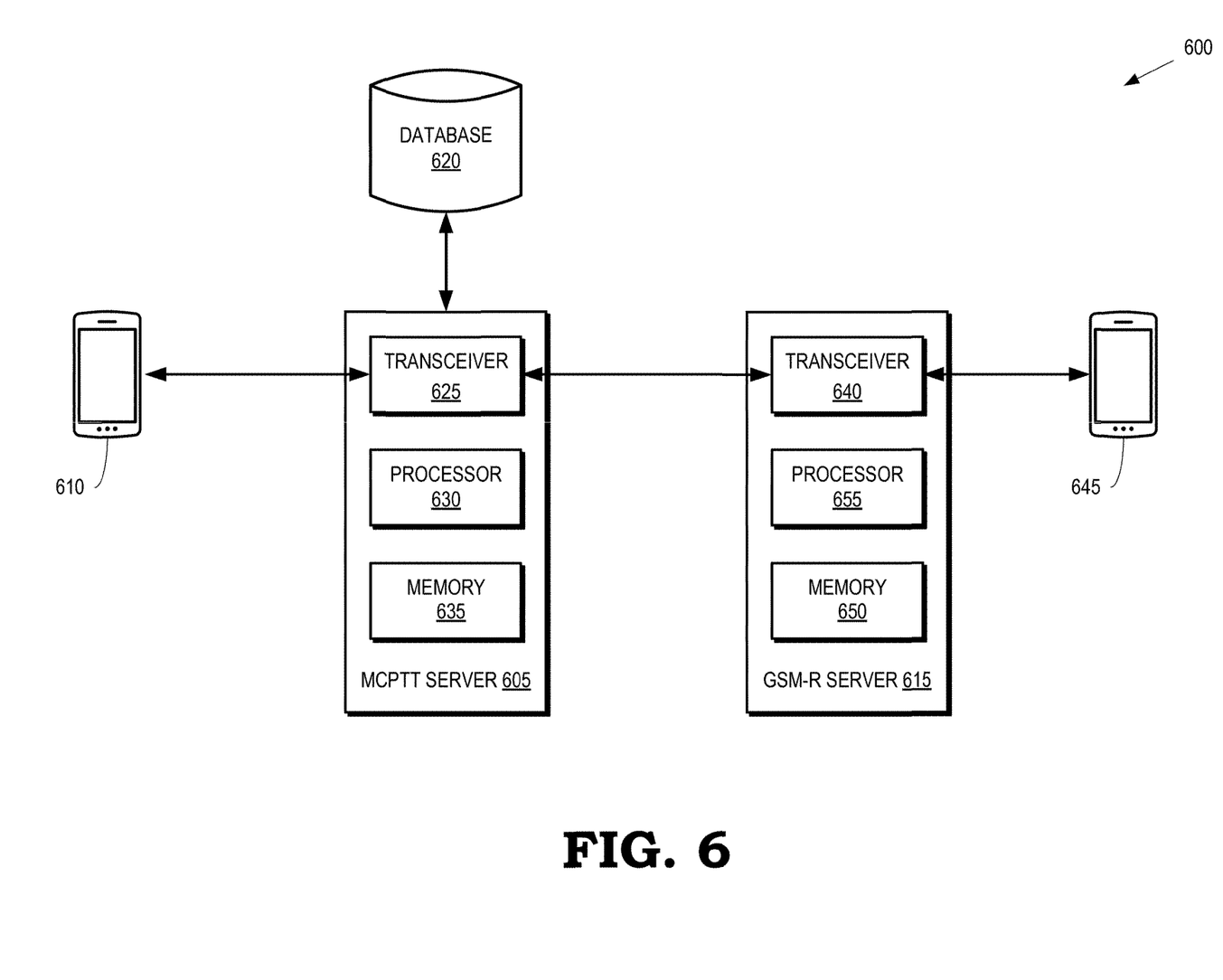
FIG. 6 is a block diagram of a communication system that includes a MCPTT server in communication with an MCPTT client and a GSM-R server according to some embodiments.

FIG. 6 is a block diagram of a communication system 600 that includes a MCPTT server 605 in communication with an MCPTT client 610 and a GSM-R server 615 according to some embodiments. The MCPTT server 605 is used to implement some embodiments of the MCPTT server 105 shown in FIG. 1 and the MCPTT system 205 shown in FIG. 2. In some embodiments, the MCPTT server 605 accesses an external database 620. The MCPTT server 605 includes a transceiver 625 that transmits or receives messages such as call requests exchanged with the GSM-R server 615 or queries and responses exchanged with the database 620. Some embodiments of the transceiver 625 are implemented using a transmitter and a receiver. The MCPTT server 605 includes memory 630 for storing information such as processor instructions, data, and the like. A processor 635 is used to process information for transmission, process received information, or perform other operations as discussed herein, e.g., by executing instructions stored in the memory 630. The MCPTT server 605 is therefore able to implement some embodiments of the message flows 400 and 500 shown in FIGS. 4 and 5, respectively.

The GSM-R server 615 is used to implement some embodiments of the GSM-R server 125 shown in FIG. 1 and the GSM-R system 210 shown in FIG. 2. The GSM-R server 615 includes a transceiver 640 that transmits or receives messages such as call requests exchanged with the MCPTT server 605 or a GSM-R client 645. Some embodiments of the transceiver 640 are implemented using a transmitter and a receiver. The GSM-R server 615 includes memory 650 for storing information such as processor instructions, data, and the like. A processor 655 is used to process information for transmission, process received information, or perform other operations as discussed herein, e.g., by executing instructions stored in the memory 650. The GSM-R server 615 is therefore able to implement some embodiments of the message flows 400 and 500 shown in FIGS. 4 and 5, respectively.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
(a) hardware-only circuit implementations (such as implementations and only analog and/or digital circuitry) and
(b) combinations of hardware circuits and software, such as (as applicable):
  (i) a combination of analog and/or digital hardware circuit(s) with software/firmware and
  (ii) any portions of a hardware processor(s) with software (including digital signal processor(s), software, and memory(ies) that work together to cause an apparatus, such as a mobile phone or server, to perform various functions) and
(c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   at least one processor; and
   at least one memory including computer program code;
   the at least one memory and the computer program code configured to, with the at least one processor, cause the apparatus at least to perform:
   receiving a call request for a mission critical, push to talk (MCPTT) call;
   accessing, in response to receiving the call request, a mapping of an MCPTT identifier of a user equipment with an interworking identifier that is formed according to an address format implemented in Global System for Mobile communications (GSM) for Railways (GSM-R); and
   forwarding the call request based on the mapping.

2. The apparatus of claim 1, wherein the MCPTT identifier is a uniform resource identifier (URI) and the interworking identifier is represented in an e164 format.

3. The apparatus of claim 1, wherein the mapping is stored in a user profile that includes a binding between the MCPTT identifier, the interworking identifier, and an identifier of the apparatus.

4. The apparatus of claim 3, wherein the at least one memory and computer program code is further configured, with the processor, to cause the apparatus to perform:
   storing the user profile in a routing table, and wherein the processor is configured to access the mapping from the memory.

5. The apparatus of claim 3, wherein the at least one memory and the computer program code is further configured to, with the at least one processor, cause the apparatus at least to perform accessing the mapping from a database that is implemented external to the apparatus.

6. The apparatus of claim 3, wherein the at least one memory and the computer program code is further configured to, with the at least one processor, cause the apparatus at least to perform receiving the call request including the MCPTT identifier in response to the user equipment initiating the MCPTT call, and wherein the processor is configured to add the interworking identifier to the call request prior to forwarding the call request to an interworking function associated with a GSM-R system.

7. The apparatus of claim 6, wherein the interworking identifier is displayed to a GSM-R client or used to initiate another call to the user equipment by the GSM-R client.

8. The apparatus of claim 3, wherein the at least one memory and the computer program code is further configured to, with the at least one processor, cause the apparatus at least to perform receiving the call request including an identifier in the address format implemented in GSM-R in response to a GSM-R client initiating a call.

9. The apparatus of claim 8, wherein the at least one memory and the computer program code is further configured to, with the at least one processor, cause the apparatus at least to perform resolving the identifier into the MCPTT identifier of the user equipment, and wherein the call request is forwarded to the user equipment based on the MCPTT identifier.

10. A method comprising:
  receiving, at a server, a call request for a mission critical, push to talk (MCPTT) call;
  accessing, from the server and in response to receiving the call request, a mapping of an MCPTT identifier of a user equipment with an interworking identifier that is formed according to an address format implemented in Global System for Mobile communications (GSM) for Railways (GSM-R); and
  forwarding the call request from the server based on the mapping.

11. The method of claim 10, wherein the MCPTT identifier is a uniform resource identifier (URI) and the interworking identifier is represented in an e164 format.

12. The method of claim 10, further comprising:
  storing the mapping in a user profile that includes a binding between the MCPTT identifier, the interworking identifier, and an identifier of the server.

13. The method of claim 12, wherein storing the mapping in the user profile comprises storing the user profile in a routing table implemented in the server, and wherein accessing the mapping comprises accessing the mapping from the user profile.

14. The method of claim 12, wherein accessing the mapping comprises accessing the mapping from a database that is implemented external to the server.

15. The method of claim 12, further comprising
  receiving, at the server, the call request including the MCPTT identifier in response to the user equipment initiating the MCPTT call;
  adding, at the server, the interworking identifier to the call request; and
  forwarding, from the server, the call request to an interworking function associated with a GSM-R system.

16. The method of claim 15, further comprising:
  displaying the interworking identifier to a GSM-R client.

17. The method of claim 15, further comprising:
  receiving, at the server, an other call request from a GSM-R client to initiate another call to the user equipment, wherein the other call request includes the interworking identifier.

18. The method of claim 10, further comprising:
  receiving, at the server, the call request including an identifier in the address format implemented in GSM-R in response to a GSM-R client initiating a call.

19. The method of claim 18, further comprising:
  resolving, at the server, the identifier into the MCPTT identifier of the user equipment; and
  forwarding, from the server, the call request to the user equipment based on the MCPTT identifier.

20. A non-transitory computer readable storage medium comprising software with instructions that, when executed by one or more processors, manipulate the one or more processors to cause an apparatus to perform
  receiving a call request for a mission critical, push to talk (MCPTT) call;
  accessing, in response to receiving the call request, a mapping of an MCPTT identifier of a user equipment with an interworking identifier that is formed according to an address format implemented in Global System for Mobile communications (GSM) for Railways (GSM-R); and
  forwarding the call request based on the mapping.

* * * * *